United States Patent
Chai et al.

(10) Patent No.: US 11,164,501 B2
(45) Date of Patent: Nov. 2, 2021

(54) DISPLAY PANEL AND DISPLAY DEVICE

(71) Applicant: Shanghai Tianma AM-OLED Co., Ltd., Shanghai (CN)

(72) Inventors: Huiping Chai, Shanghai (CN); Lijing Han, Shanghai (CN)

(73) Assignee: SHANGHAI TIANMA AM-OLED CO., LTD., Shanghai (CN)

( * ) Notice: Subject to any disclaimer, the term of this patent is extended or adjusted under 35 U.S.C. 154(b) by 0 days.

(21) Appl. No.: 16/730,718

(22) Filed: Dec. 30, 2019

(65) Prior Publication Data

US 2021/0097919 A1 Apr. 1, 2021

(30) Foreign Application Priority Data

Sep. 30, 2019 (CN) .......................... 201910944114.4

(51) Int. Cl.
*G09G 3/20* (2006.01)
*G02B 27/10* (2006.01)

(52) U.S. Cl.
CPC ....... *G09G 3/2003* (2013.01); *G02B 27/1053* (2013.01); *G09G 2300/0443* (2013.01); *G09G 2300/0452* (2013.01); *G09G 2320/0242* (2013.01); *G09G 2320/0626* (2013.01)

(58) Field of Classification Search
CPC ......... G09G 3/2003; G09G 2300/0443; G09G 2300/0452; G09G 2320/0242; G09G 2320/0626; G02B 27/1053
See application file for complete search history.

(56) References Cited

U.S. PATENT DOCUMENTS

| 2013/0201417 A1* | 8/2013 | Murao ................. H04N 13/324 349/15 |
| 2018/0203305 A1* | 7/2018 | Xian ................. H01L 29/78633 |
| 2020/0142251 A1* | 5/2020 | Hasegawa ......... G02F 1/134336 |

FOREIGN PATENT DOCUMENTS

CN 107331692 A 11/2017

* cited by examiner

*Primary Examiner* — Chanh D Nguyen
*Assistant Examiner* — Ngan T. Pham-Lu
(74) *Attorney, Agent, or Firm* — Alston & Bird LLP (57) ABSTRACT

Provided are a display panel and a display device. The display panel is configured such that a first luminous intensity of a first sub-pixel is greater than a second luminous intensity of a second sub-pixel at a same driving current. A light blocking structure includes a grid-shaped grid line, the shortest distance between a first orthographic projection of a first sub-pixel onto a substrate and a third orthographic projection of the grid line onto the substrate is $D_{1H}$ along the row direction of an array, the shortest distance between a second orthographic projection of a second sub-pixel onto the substrate and the third orthographic projection of the grid line onto the substrate is $D_{2H}$ along the row direction of the array, where $D_{1H} < D_{2H}$.

20 Claims, 10 Drawing Sheets

DISPLAY PANEL AND DISPLAY DEVICE

CROSS-REFERENCE TO RELATED APPLICATION

The application claims the benefit of the earlier filing date of Chinese Patent Application No. CN 201910944114.4, filed on Sep. 30, 2019, the contents of which are incorporated by reference herein in their entirety.

TECHNICAL FIELD

The present disclosure relates to display technologies and, in particular, to a display panel and a display device.

BACKGROUND

Display technologies are widely used for televisions, mobile phones and public information display. Display panels for displaying images are also various and may display colorful images.

However, images displayed in existing display panels often have a color cast, and especially, the color cast is more serious at a large viewing angle, thereby negatively affecting the user experience.

SUMMARY

Embodiments of the present disclosure provide a display panel and a display device to relieve or even eliminate the color cast problem of the display panel at a large viewing angle.

In a first aspect, an embodiment of the present disclosure provides a display panel. The display panel includes a display region, a substrate, a display function layer and a light blocking structure.

The display function layer is positioned in the display region on one side of the substrate. The display function layer includes multiple pixels arranged in an array along a first direction and a second direction, and each pixel includes multiple sub-pixels. The multiple sub-pixels includes at least a first sub-pixel emitting a first color and a second sub-pixel emitting a second color, and a first luminous intensity of the first sub-pixel is greater than a second luminous intensity of the second sub-pixel at a same driving current.

The light blocking structure is positioned on a first side, facing away from the substrate, of the display function layer and includes a grid-shaped grid line. Along the direction vertical to the substrate, each sub-pixel is positioned in a grid surrounded by the grid line, and at least part of the grid line blocks light.

A first shortest distance between the first orthographic projection of the first sub-pixel onto the substrate and a third orthographic projection of the grid line onto the substrate is $D_{1H}$ along the row direction of the array, and a second shortest distance between the second orthographic projection of the second sub-pixel onto the substrate and the third orthographic projection of the grid line onto the substrate is $D_{2H}$ along the row direction of the array. The first shortest distance between the first orthographic projection of the first sub-pixel onto the substrate and the third orthographic projection of the grid line onto the substrate is $D_{1V}$ along the column direction of the array, and the second shortest distance between the second orthographic projection of the second sub-pixel onto the substrate and the third orthographic projection of the grid line onto the substrate is $D_{2V}$ along the column direction of the array. One or more of $D_{1H}<D_{2H}$ or $D_{1V}<D_{2V}$.

In a second aspect, an embodiment of the present disclosure provides a display device including the display panel described in the first aspect.

In the embodiments of the present disclosure, since the first luminous intensity of the first sub-pixel is greater than the second luminous intensity of the second sub-pixel, a first distance between the first sub-pixel and the grid line along the row direction of the array is set to be less than a second distance between the second sub-pixel and the grid line along the row direction of the array, or/and the first distance between the first sub-pixel and the grid line along the column direction of the array is set to be less than the second distance between the second sub-pixel and the grid line along the column direction of the array, so that the first sub-pixel is closer to the grid line and the second sub-pixel is farther from the grid line. In this way, at an oblique viewing angle, the blocking degree of the grid line for the first sub-pixel is greater than the blocking degree of the grid line for the second sub-pixel, so that the first luminous intensity of the first sub-pixel visible to human eyes and the second luminous intensity of the second sub-pixel visible to the human eyes are equalized, and thereby the color cast problem of the display panel at a large viewing angle is relieved or even eliminated.

DETAILED DESCRIPTION

Hereinafter the present disclosure will be further described in detail in conjunction with the drawings and embodiments. It is to be understood that the embodiments set forth below are merely intended to illustrate and not to limit the present disclosure. Additionally, it is to be noted that, for ease of description, only part, not all, of the structures related to the present disclosure are illustrated in the drawings.

Figure 1:
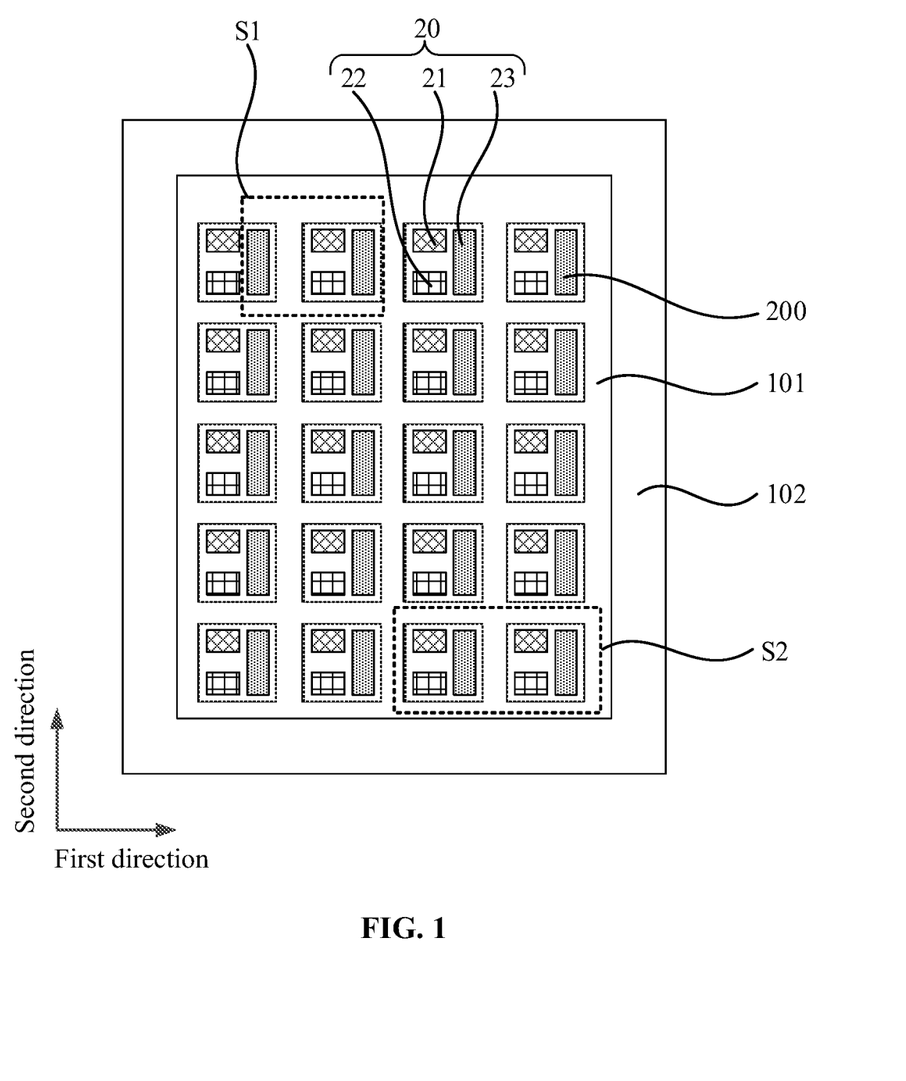
FIG. 1 is a top view of a display panel according to an embodiment of the present disclosure.
Figure 2:
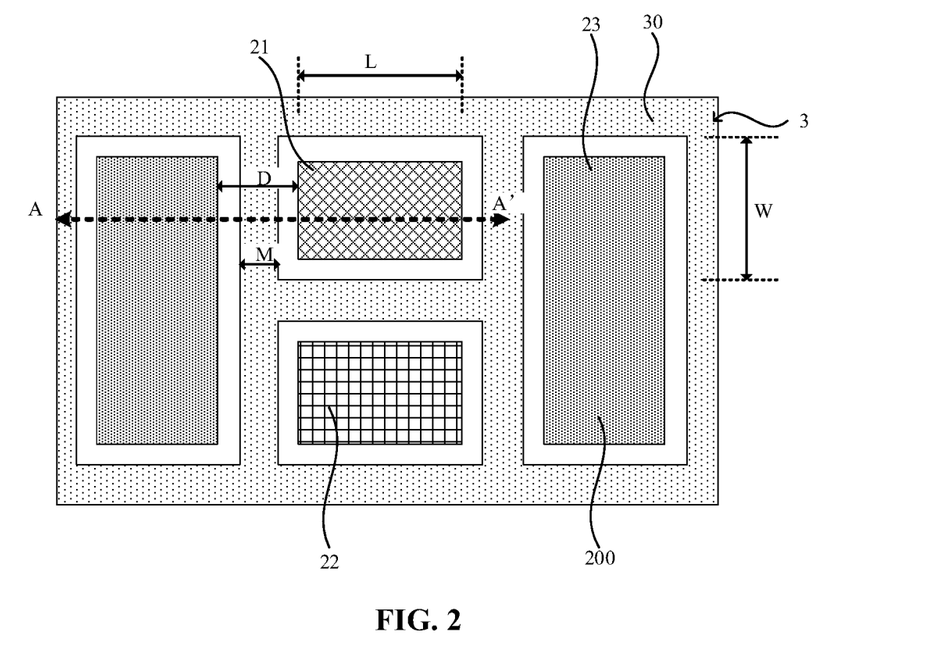
FIG. 2 is an enlarged diagram of region S1 of FIG. 1.
Figure 3:
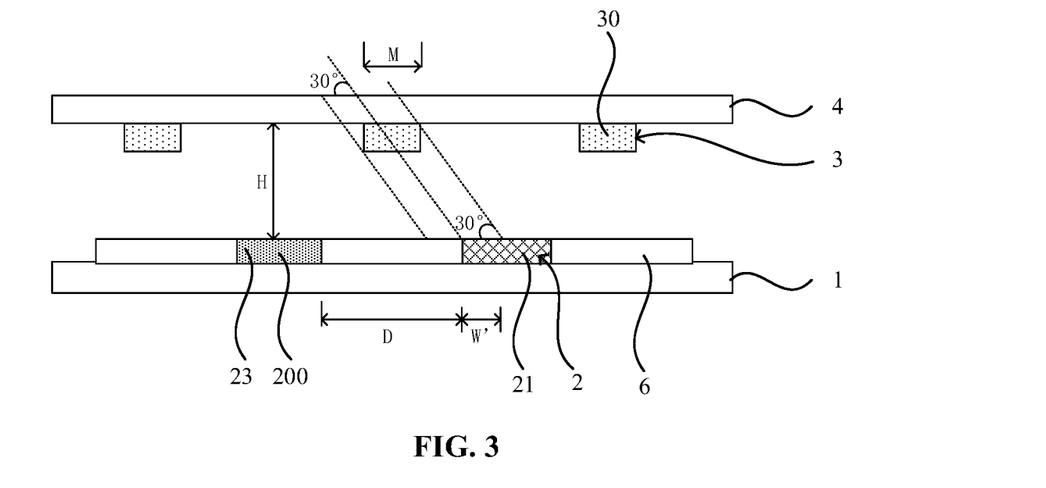
FIG. 3 is a structural diagram along section AA' of FIG. 2.

FIG. 1 is a top view of a display panel according to an embodiment of the present disclosure, FIG. 2 is an enlarged diagram of region S1 of FIG. 1, and FIG. 3 is a structural diagram along section AA' of FIG. 2. Referring to FIGS. 1, 2 and 3, the display panel includes a display region 101 and a non-display region 102 positioned at the periphery of the display region 101. In other embodiments, the display panel may include only the display region 101 without the non-display region 102, thereby implementing a full screen. The display panel includes a substrate 1 and a display function layer 2. The display function layer 2 is positioned in the display region 101 on one side of the substrate 1. The display function layer 2 includes multiple pixels 20 arranged in an array along a first direction and a second direction, and each pixel 20 includes multiple sub-pixels 200. The multiple sub-pixels 200 include at least a first sub-pixel 21 emitting a first color and a second sub-pixel 22 emitting a second color. The first luminous intensity of the first sub-pixel 21 is greater than the second luminous intensity of the second sub-pixel 22 at the same driving current. For example, a manufacturing process easily causes the luminous intensity of a sub-pixel emitting red light to be greater than the luminous intensity of a sub-pixel emitting green light in the display panel, and thus causes the display panel to be reddish when displaying a white image, thereby generating a color cast and affecting the display effect.

Figure 4:
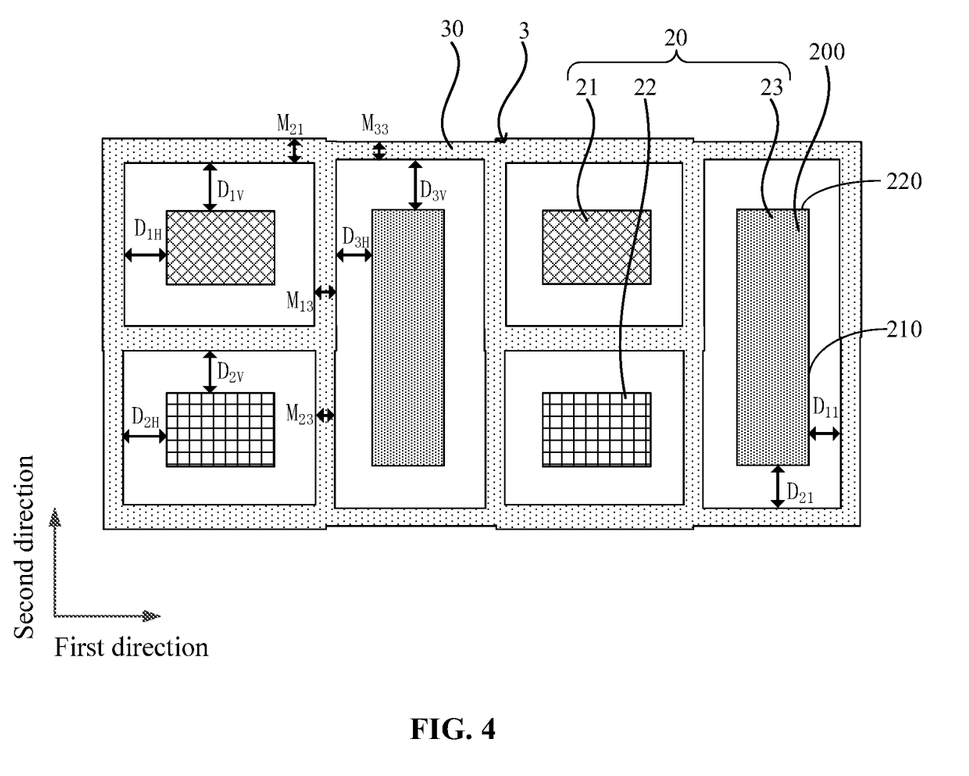
FIG. 4 is an enlarged diagram of region S2 of FIG. 1.

FIG. 4 is an enlarged diagram of region S2 of FIG. 1. Referring to FIG. 4 in conjunction with FIGS. 1 to 3, the display panel may further include a light blocking structure 3. The light blocking structure 3 is positioned on one side, facing away from the substrate 1, of the display function layer 2 and includes a grid-shaped grid line 30. Along the direction vertical to the substrate 1, each sub-pixel 200 is positioned in a grid surrounded by the grid line 30, and at least part of the grid line 30 blocks light. That is, at least part of the grid line is a light-opaque structure. The first shortest distance between the first orthographic projection of the first sub-pixel 21 onto the substrate 1 and the third orthographic projection of the grid line 30 onto the substrate 1 is $D_{1H}$ along the row direction of the array. The second shortest distance between the second orthographic projection of the second sub-pixel 22 onto the substrate 1 and the third orthographic projection of the grid line onto the substrate 1 is $D_{2H}$ along the row direction of the array. The row direction of the array may be a first direction. The first shortest distance between the first orthographic projection of the first sub-pixel 21 onto the substrate 1 and the third orthographic projection of the grid line 30 onto the substrate 1 is $D_{1V}$ along the column direction of the array. The second shortest distance between the second orthographic projection of the second sub-pixel 22 onto the substrate 1 and the third orthographic projection of the grid line 30 onto the substrate 1 is $D_{2V}$ along the column direction of the array. The column direction of the array may be a second direction. One or more of $D_{1H}<D_{2H}$ or $D_{1V}<D_{2V}$.

In this embodiment of the present disclosure, since a first luminous intensity of the first sub-pixel is greater than a second luminous intensity of the second sub-pixel, the distance between the first sub-pixel and the grid line along the row direction of the array is set to be less than the distance between the second sub-pixel and the grid line along the row direction of the array, or/and the distance between the first sub-pixel and the grid line along the column direction of the array is set to be less than the distance between the second sub-pixel and the grid line along the column direction of the array, so that the first sub-pixel is closer to the grid line and the second sub-pixel is farther from the grid line. In this way, at an oblique viewing angle, the blocking degree of the grid line for the first sub-pixel is greater than the blocking degree of the grid line for the second sub-pixel, so that the luminous intensity of the first sub-pixel visible to human eyes and the luminous intensity of the second sub-pixel visible to the human eyes are equalized, and thereby the color cast problem of the display panel at a large viewing angle is relieved or even eliminated. The blocking degree may be understood as the ratio of a light-emitting area, blocked and not visible to the human eyes, of a sub-pixel at an oblique viewing angle to an overall light-emitting area of the sub-pixel.

Researchers of the present application studied the case where the grid line 30 blocks the sub-pixel 200. For simplicity, in this application, a description is given below using an example in which the grid line 30 blocks the first sub-pixel 21 and the oblique viewing angle is 30° with respect to the display panel viewed from the left side. The case where the grid line 30 blocks another sub-pixel 200 (for example, the second sub-pixel 22) excluding the first sub-pixel 21 in the multiple pixels 20 is similar to this example and is not repeated here.

For example, referring to FIG. 3, the display panel further includes a cover plate 4 disposed opposite to the substrate 1, and the light blocking structure 3 is disposed on one side, facing the substrate 1, of the cover plate 4. The display panel may further include a pixel defining layer 6 positioned on one side, facing the light blocking structure 3, of the substrate 1. The multiple sub-pixels 200 are positioned within openings of the pixel defining layer 6. The orthographic projection of the light blocking structure 3 onto the substrate 1 is positioned within the orthographic projection of the pixel defining layer 6 onto the substrate. Each sub-pixel 200 may include a cathode, an anode, an organic light-emitting unit and the like. The display panel may be an organic light-emitting display panel. In other embodiments, the display panel may be a liquid crystal display panel, which is not limited in the present disclosure.

As shown in FIG. 3, when the oblique viewing angle is 30° with respect to the display panel, the blocking width W' of the grid line 30 for the first sub-pixel 21 satisfies the formula (1) described below.

$$W'=H*\tan 60°-(D-M)/2 \quad (1)$$

H denotes the distance between the light blocking structure 3 and the display function layer 2 along the direction vertical to the substrate 1. D denotes the shortest distance between orthographic projections of two adjacent sub-pixels 200 onto the substrate 1, and M denotes the line width of the grid line 30.

The luminance loss ratio of the first sub-pixel 21 is R'. The greater the luminance loss ratio R' is, the greater the blocking degree is. The less the luminance loss ratio R' is, the less the blocking degree is. R' satisfies the formula(e) (2, 3) described below.

$$R'=1-T\%+((L'*W')/(L*W))*T\% \quad (2)$$

$$R'=1-T\%+(L'*(H*\tan 60°-(D-M)/2))/(L*W)*T\% \quad (3)$$

L denotes the length of the first sub-pixel 21, W denotes the width of the first sub-pixel 21, T % denotes the transmittance of the display panel, and L' denotes the blocking width of a light-opaque portion of the grid line 30 for the first sub-pixel 21. It can be seen that at an oblique viewing angle, the blocking degree of the grid line 30 for the first sub-pixel 21 is related to L', H, D, M, L and W. The greater H is, or the less D is, or the greater M is, or the greater L' is, the greater the blocking degree of the light-opaque portion for the sub-pixel is.

Optionally, referring to FIG. 4, the multiple sub-pixels 200 further include a third sub-pixel 23 emitting a third color. The luminous intensity of the second sub-pixel 22 is greater than the luminous intensity of the third sub-pixel 23 at the same driving current. The shortest distance between the orthographic projection of the third sub-pixel 23 onto the substrate 1 and the orthographic projection of the grid line 30 onto the substrate 1 is $D_{3H}$ along the row direction of the array. The shortest distance between the orthographic projection of the third sub-pixel 23 onto the substrate 1 and the orthographic projection of the grid line 30 onto the substrate 1 is $D_{3V}$ along the column direction of the array. One or more of $D_{2H}<D_{3H}$ or $D_{2V}<D_{3V}$. That is, there are multiple cases of shortest distances between orthographic projections of the first sub-pixel 21, the second sub-pixel 22 and the third sub-pixel 23 onto the substrate 1 and the orthographic projection of the grid line 30 onto the substrate 1. When $D_{1H}<D_{2H}$, there are three solutions, which are solution 1: $D_{1H}<D_{2H}<D_{3H}$, solution 2: $D_{1H}<D_{2H}$ and $D_{2V}<D_{3V}$, and solution 3: $D_{1H}<D_{2H}<D_{3H}$ and $D_{2V}<D_{3V}$. When $D_{1V}<D_{2V}$, there are three solutions, which are solution 4: $D_{2H}<D_{3H}$ and $D_{1V}<D_2$, solution 5: $D_{1V}<D_{2V}<D_{3V}$, and solution 6: $D_{2H}<D_{3H}$ and $D_{1V}<D_{2V}<D_{3V}$. When $D_{1H}<D_{2H}$ and $D_{1V}<D_{2V}$, there are three solutions, which are solution 7: $D_{1H}<D_{2H}<D_{3H}$ and $D_{1V}<D_{2V}$, solution 8: $D_{1H}<D_{2H}$ and $D_{1V}<D_{2V}<D_{3V}$, solution 9: $D_{1H}<D_{2H}<D_{3H}$ and $D_{1V}<D_{2V}<D_{3V}$.

Optionally, referring to FIG. 4, the multiple sub-pixels 200 further include the third sub-pixel 23 emitting the third color. The luminous intensity of the second sub-pixel 22 is greater than the luminous intensity of the third sub-pixel 23 at the same driving current. In each pixel 20, the first sub-pixel 21, the second sub-pixel 22 and the third sub-pixel 23 are arranged in a delta shape. The first sub-pixel 21 is arranged in the same column as the second sub-pixel 22 along the column direction of the array. The third sub-pixel 23 is positioned in a different column than the first sub-pixel 21. The multiple pixels 20 are arranged cyclically along the row direction of the array and the column direction of the array. The line width of the grid line 30 between the second sub-pixel 22 and the first sub-pixel 21 adjacent to each other is $M_{21}$. The line width of the grid line 30 between the first sub-pixel 21 and the third sub-pixel 23 adjacent to each other is $M_{13}$. The line width of the grid line 30 between the second sub-pixel 22 and the third sub-pixel 23 adjacent to each other is $M_{23}$. The line width of the grid line between two adjacent third sub-pixels 23 is $M_{33}$. $M_{21}>M_{13}>M_{23}>M_{33}$. In this embodiment of the present disclosure, on the basis of the settings: one or more of $D_{1H}<D_{2H}$ or $D_{1V}<D_{2V}$, the line width of the grid line 30 corresponding to the sub-pixel 200 having a greater luminous intensity is set to be greater, so that the blocking degree of the grid line 30 for the sub-pixel 200 having a greater luminous intensity is greater and the blocking degree of the grid line 30 for the sub-pixel 200 having a less luminous intensity is less. It is to be noted that the blocking degree of the grid line 30 for the sub-pixel 200 should be understood as a whole. Exemplarily, the grid line 30 between the first sub-pixel 21 and third sub-pixel 23 adjacent to each other blocks the third sub-pixel 23 when viewed from the left side, and the grid line 30 between the first sub-pixel 21 and the third sub-pixel 23 adjacent to each other blocks the first sub-pixel 21 when viewed from the right side. That is, the same grid line 30 blocks different sub-pixels 200 at different oblique viewing angles. Similarly, the grid line 30 between the second sub-pixel 22 and third sub-pixel 23 adjacent to each other blocks the third sub-pixel 23 when viewed from the left side, and the grid line 30 between the second sub-pixel 22 and the third sub-pixel 23 adjacent to each other blocks the second sub-pixel 22 when viewed from the right side. In general, at the same oblique viewing angle, the blocking degree of the grid line 30 for the first sub-pixel 21 is greater than the blocking degree of the grid line 30 for the second sub-pixel 22, so that the luminous intensity of the first sub-pixel 21 visible to the human eyes and the luminous intensity of the second sub-pixel 22 visible to the human eyes are equalized, and thereby the color cast problem of the display panel at a large viewing angle is relieved or even eliminated.

Optionally, referring to FIG. 4, the sub-pixel 200 includes a first edge 210 and a second edge 220, and the length of the first edge is greater than the length of the second edge. The sub-pixel 200 may be the first sub-pixel 21, the second pixel 22 or the third pixel 23. The shortest distance between the orthographic projection of the first edge 210 onto the substrate 1 and the orthographic projection of the grid line 30 closest to the first edge 210 onto the substrate 1 is $D_{11}$. The shortest distance between the orthographic projection of the second edge 220 onto the substrate 1 and the orthographic projection of the grid line 30 closest to the second edge 220 onto the substrate 1 is $D_{21}$. $D_{11}>D_{21}$. As shown in formula $R'=1-T\ \%+(L'*(H*\tan 60°-(D-M)/2))/(L*W)*T\ \%$, the greater the blocking width of the light-opaque portion of the grid line 30 for the first sub-pixel 21 is, the greater the blocking degree is. That is, the greater the length of the edge blocked by the grid line 30, the greater the blocking degree for the light emitted by the sub-pixel. In this embodiment of the present disclosure, the grid line 30 is set to be farther from the longer first edge 210, and the grid line 30 is set to be closer to the shorter second edge 220. In this way, the blocking degree of the grid line 30 for the first edge 210 of the sub-pixel 200 and the blocking degree of the grid line 30 for the second edge 220 of the same sub-pixel 200 are equalized, and luminous intensities of the same sub-pixel 200 when viewed in different directions are equalized, thereby improving the display quality.

For example, referring to FIG. 4, the shortest distance between the orthographic projection of the first edge 210 of the third sub-pixel 23 onto the substrate 1 and the orthographic projection of the grid line 30 closest to the first edge 210 onto the substrate 1 is $D_{3H}$ (where $D_{11}=D_{3H}$), the shortest distance between the orthographic projection of the second edge 220 of the third sub-pixel 23 onto the substrate 1 and the orthographic projection of the grid line 30 closest to the second edge 220 onto the substrate 1 is $D_{3V}$ (where $D_{21}=D_{3V}$), and $D_{3H}>D_{3V}$.

Figure 5:
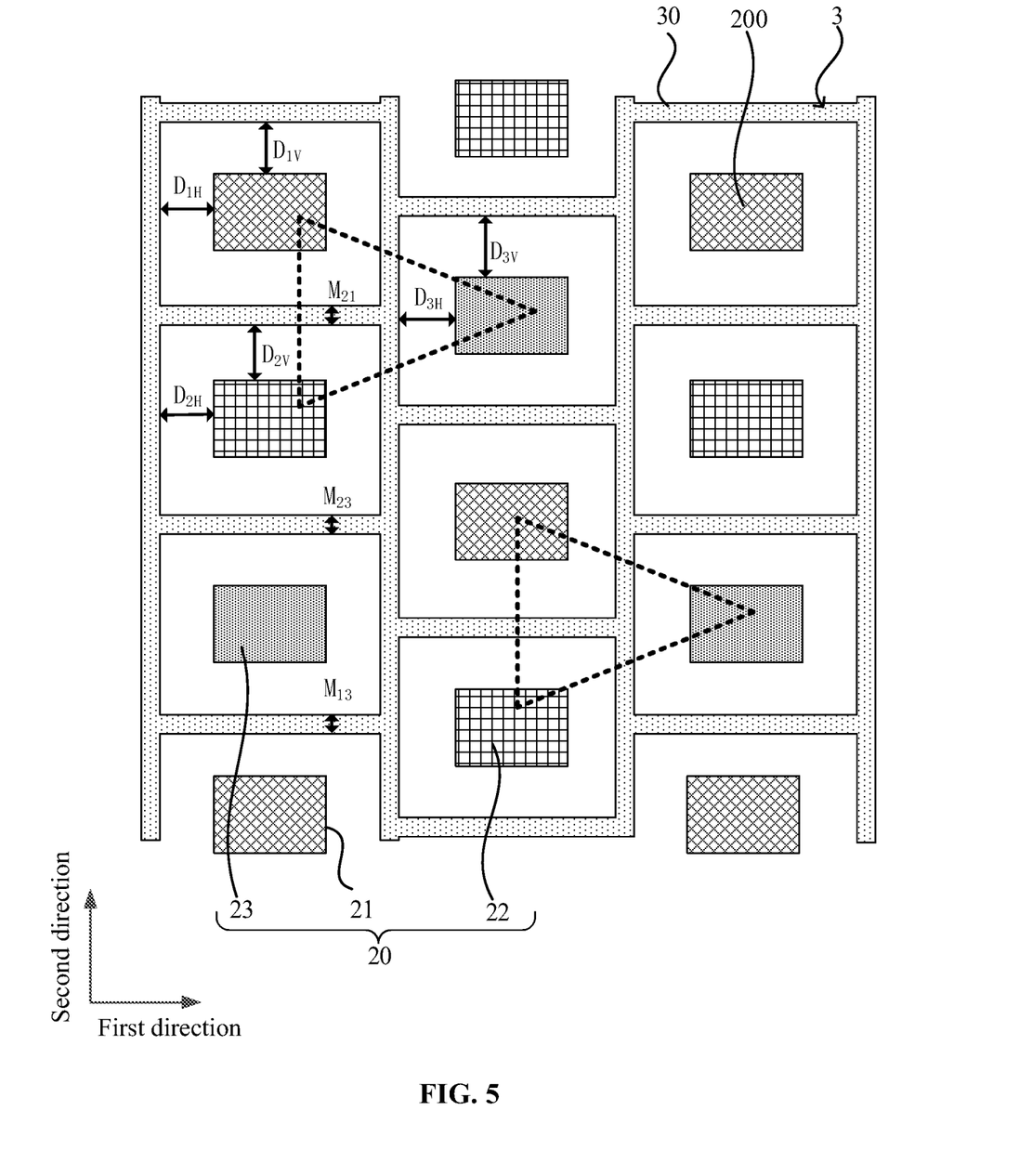
FIG. 5 is a top view of another display panel according to an embodiment of the present disclosure.

FIG. 5 is a top view of another display panel according to an embodiment of the present disclosure. Referring to FIG. 5, the multiple sub-pixels 200 further include the third sub-pixel 23 emitting the third color, and the luminous intensity of the second sub-pixel 22 is greater than the luminous intensity of the third sub-pixel 23 at the same driving current. In each pixel 20, the first sub-pixel 21, the second sub-pixel 22 and the third sub-pixel 23 are arranged in the delta shape. The first sub-pixel 21 is arranged in the same column as the second sub-pixel 22 along the column direction of the array. In each pixel 20, the third sub-pixel 23 is positioned in the different column than the first sub-pixel 21. Along the column direction of the array, the multiple pixels 20 are arranged cyclically, and two adjacent rows of pixels 20 are misaligned by the distance of the width of one sub-pixel 200 (where the dashed triangular region in FIG. 5 illustrates two pixels 20 in the two adjacent rows). The line width of the grid line 30 between the second sub-pixel 22 and the first sub-pixel 21 adjacent to each other is $M_{21}$. The line width of the grid line 30 between the first sub-pixel 21 and the third sub-pixel 23 adjacent to each other is Mo. The line width of the grid line 30 between the second sub-pixel 22 and the third sub-pixel 23 adjacent to each other is $M_{23}$. $M_{21}>M_{13}>M_{23}$. In this embodiment of the present disclosure, on the basis of the settings: one or more of $D_{1H}<D_{2H}$ or $D_{1V}<D_{2V}$, the line width of the grid line 30 corresponding to the sub-pixel 200 having a greater luminous intensity is set to be greater, so that the blocking degree of the grid line 30 for the sub-pixel 200 having a greater luminous intensity is greater and the blocking degree of the grid line 30 for the sub-pixel 200 having a less luminous intensity is less. In this way, the luminous intensities of each sub-pixel from non-vertical perspectives are equalized, so that the color cast problem is relieved and the display panel is ensured to have a good display effect when viewed at various viewing angles.

Figure 6:
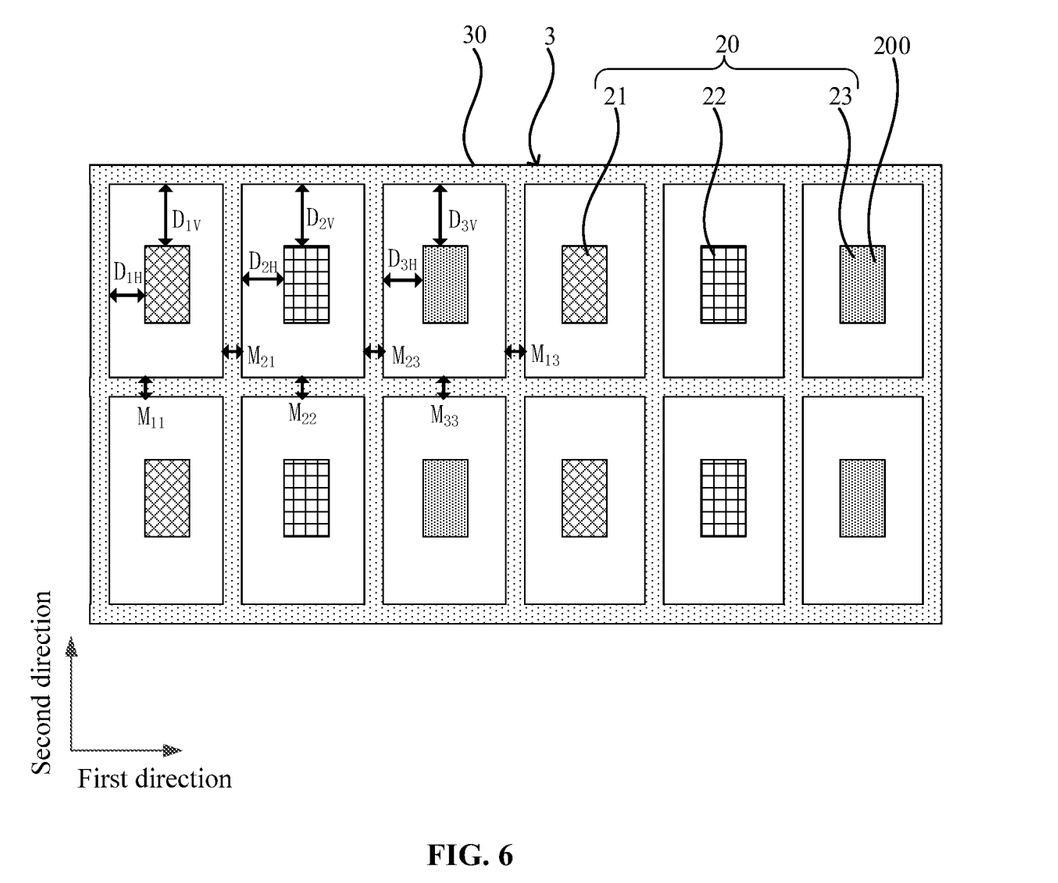
FIG. 6 is a top view of another display panel according to an embodiment of the present disclosure.

FIG. 6 is a top view of another display panel according to an embodiment of the present disclosure. Referring to FIG. 6, each pixel 20 further includes the third sub-pixel 23 emitting the third color, and the luminous intensity of the second sub-pixel 22 is greater than the luminous intensity of the third sub-pixel 23 at the same driving current. In each pixel 20, the first sub-pixel 21, the second sub-pixel 22 and the third sub-pixel 23 are arranged in sequence along the row direction of the array. The multiple pixels 20 are arranged cyclically along the row direction of the array and the column direction of the array. The line width of the grid line 30 between the second sub-pixel 22 and the first sub-pixel 21 adjacent to each other is $M_{21}$. The line width of the grid line 30 between the first sub-pixel 21 and the third sub-pixel 23 adjacent to each other is Mia. The line width of the grid line 30 between the second sub-pixel 22 and the third sub-pixel 23 adjacent to each other is $M_{23}$. The line width of the grid line 30 between two adjacent first sub-pixels 21 is $M_{11}$. The line width of the grid line 30 between two adjacent second sub-pixels 22 is $M_{22}$. The line width of the grid line 30 between two adjacent third sub-pixels 23 is $M_{33}$. $M_{21}>M_{13}>M_{23}>M_{33}$ and $M_{11}>M_{22}>M_{33}$. In this embodiment of the present disclosure, on the basis of the settings: one or more of $D_{1H}<D_{2H}$ or $D_{1V}<D_{2V}$, the line width of the grid line 30 corresponding to the sub-pixel 200 having a greater luminous intensity is set to be greater, so that the blocking degree of the grid line 30 for the sub-pixel 200 having a greater luminous intensity is greater and the blocking degree of the grid line 30 for the sub-pixel 200 having a less luminous intensity is less.

Optionally, referring to FIGS. 1 to 6, the light blocking structure 3 includes a touch electrode, which includes a grid-shaped touch electrode line. That is, the grid line 30 is the touch electrode line. The touch electrode line includes at least a metal material, which is a light-opaque material.

For example, referring to FIG. 3, the light blocking structure 3 includes the touch electrode, which is positioned between the cover plate 4 and the substrate 1. In this embodiment of the present disclosure, the touch electrode is positioned between the substrate 1 and the cover plate 4 and integrated into the display panel, so that no touch panel is needed and the thickness of the display panel is reduced compared with the case where the touch electrode is disposed outside the display panel.

Figure 7:
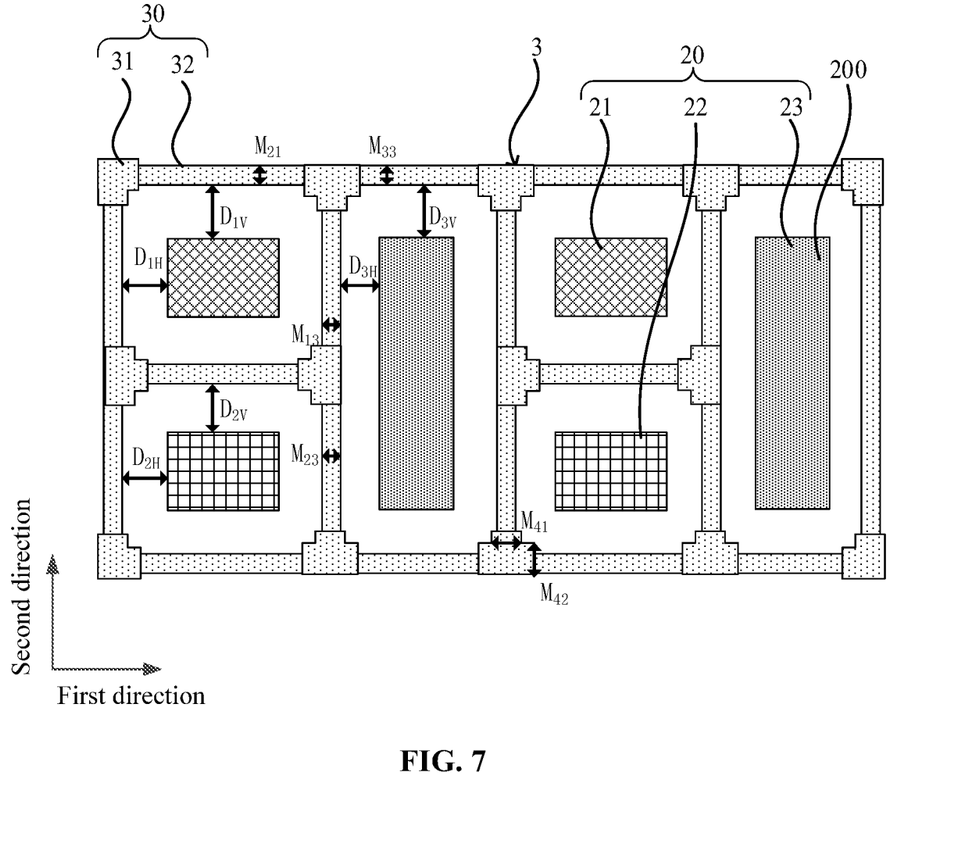
FIG. 7 is a top view of another display panel according to an embodiment of the present disclosure.

FIG. 7 is a top view of another display panel according to an embodiment of the present disclosure. Referring to FIG. 7, the touch electrode line includes a first touch electrode line 31 made of the metal material and a second touch electrode line 32 made of the metal material. The first touch electrode line 31 is positioned at a corner of the grid, and the line width of the first touch electrode line 31 is greater than the line width of the second touch electrode line 32. Since the touch electrode line (that is, the first touch electrode line 31) positioned at the corner of the grid almost does not block the sub-pixel 200 at an oblique viewing angle, the line width of the touch electrode line positioned at the corner of the grid may be properly widened, so that the resistance of the touch electrode line is reduced and the touch sensitivity of the touch electrode is improved. The line width of the first touch electrode line 31 along the row direction of the array is $M_{41}$, and the line width of the first touch electrode line 31 along the column direction of the array is $M_{42}$. The setting in which the line width of the first touch electrode line 31 is greater than the line width of the second touch electrode line 32 refers to that the line width of the first touch electrode line 31 along the row direction of the array is greater than the line width of the second touch electrode line 32 along the row direction of the array and the line width of the first touch electrode line 31 along the column direction of the array is greater than the line width of the second touch electrode line 32 along the column direction of the array. That is, $M_{41}>M_{13}$, $M_{41}>M_{23}$, $M_{42}>M_{21}$, and $M_{42}>M_{33}$. In this embodiment of the present disclosure, the distance between the touch electrode line and the sub-pixel 200 along the row direction of the array refers to the shortest distance between the orthographic projection of the second touch electrode line 32 onto the substrate 1 and the orthographic projection of the sub-pixel 200 onto the substrate 1 along the row direction of the array. The distance between the touch electrode line and the sub-pixel 200 along the column direction of the array refers to the shortest distance between the orthographic projection of the second touch electrode line 32 onto the substrate 1 and the orthographic projection of the sub-pixel 200 onto the substrate 1 along the column direction of the array. The line width of the grid line 30 between adjacent sub-pixels 200 refers to the line width of the second touch electrode line 32 between the adjacent sub-pixels 200. It is to be noted that only one pixel arrangement mode is illustrated as an example in FIG. 7 and is not intended to limit the present disclosure.

For example, referring to FIG. 7, the first touch electrode line 31 and the second touch electrode line 32 may be formed in the same process by using the same material, so that the process is saved. The first touch electrode line 31 and the second touch electrode line 32 may be integrally formed. In other embodiments, the first touch electrode line 31 and the second touch electrode line 32 may also be two independent components and are manufactured in different processes.

Figure 8:
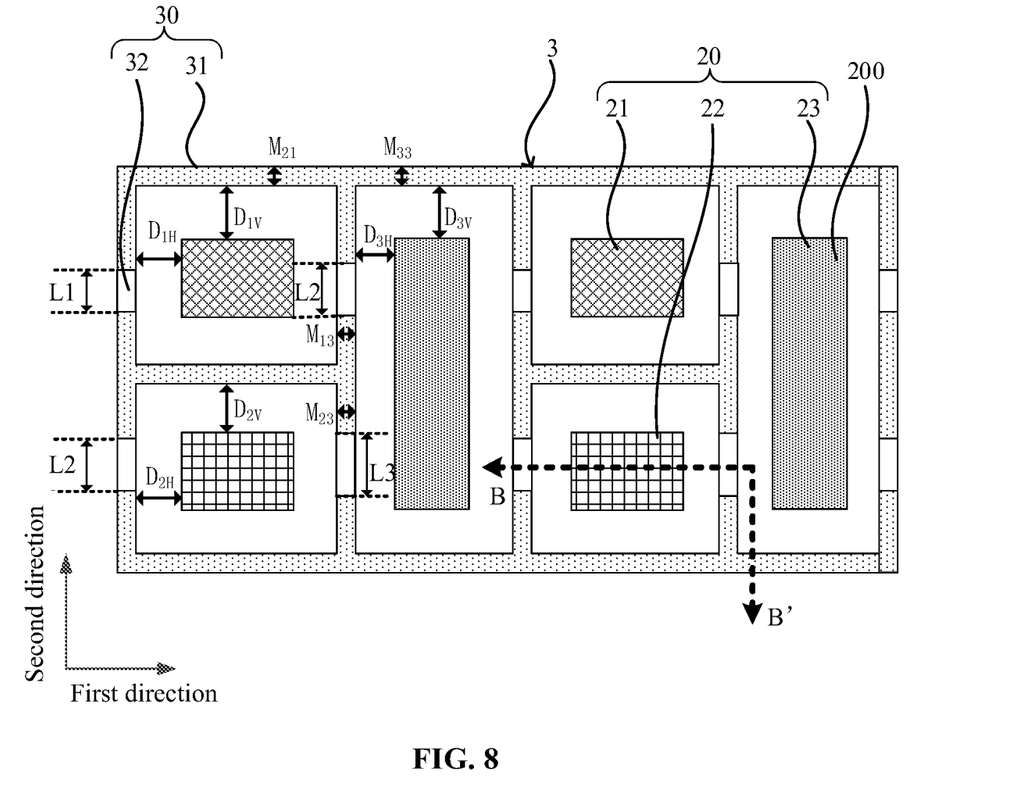
FIG. 8 is a top view of another display panel according to an embodiment of the present disclosure.

FIG. 8 is a top view of another display panel according to an embodiment of the present disclosure. Referring to FIG. 8, the touch electrode line includes the first touch electrode line 31 made of the metal material and the second touch electrode line 32 made of a transparent conductive material. In the touch electrode line extending along the column direction of the array, the length of the second touch electrode line 32 closest to and surrounding the first sub-pixel 21 is less than the length of the second touch electrode 32 line closest to and surrounding the second sub-pixel 22. In the embodiments of the present disclosure, the distance between the touch electrode line (including the first touch electrode line 31 and the second touch electrode line 32) and the sub-pixel (including the first sub-pixel 21 and the second sub-pixel 22) refers to the shortest distance between the orthographic projection of the touch electrode line onto the substrate 1 and the orthographic projection of the sub-pixel onto the substrate 1.

Since the second touch electrode line 32 is made of the transparent conductive material and does not block the sub-pixel 200 at an oblique viewing angle, the sub-pixel 200 is blocked by the first touch electrode line 31 at an oblique viewing angle.

In the touch electrode line extending along the column direction of the array, the length of the second touch electrode line 32 closest to and surrounding the first sub-pixel 21 is less than the length of the second touch electrode 32 line closest to and surrounding the second sub-pixel 22. In the touch electrode line extending along the column direction of the array, the length of the first touch electrode line 31 closest to and surrounding the first sub-pixel 21 is greater than the length of the first touch electrode line 31 closest to and surrounding the second sub-pixel 22. In this way, the blocking degree of the first touch electrode line 31 for the first sub-pixel 21 is greater than the blocking degree of first touch electrode line 31 for the second sub-pixel 22, so that the luminous intensity of the first sub-pixel 21 visible to the human eyes and the luminous intensity of the second sub-pixel 22 visible to the human eyes are equalized, and thereby the color cast problem of the display panel at a large viewing angle is relieved or even eliminated. Additionally, in this embodiment of the present disclosure, the second touch electrode line 32 is made of the transparent material and does not block the sub-pixel 200, so that the luminous efficiency of the sub-pixel 200 is increased and the luminous intensity of the sub-pixel 200 of the display panel is increased. It is to be understood that, in other embodiments, the touch electrode line may be configured such that: in the touch electrode line extending along the column direction of the array, the length of the second touch electrode line 32 closest to and surrounding the first sub-pixel 21 is less than the length of the second touch electrode 32 line closest to and surrounding the second sub-pixel 22; or in the touch electrode line extending along the column direction of the array, the length of the second touch electrode line 32 closest to and surrounding the first sub-pixel 21 is less than the length of the second touch electrode line 32 closest to and surrounding the second sub-pixel 22; and in the touch electrode line extending along the row direction of the array, the length of the second touch electrode line 32 closest to and surrounding the first sub-pixel 21 is less than the length of the second touch electrode 32 line closest to and surrounding the second sub-pixel 22. In this embodiment of the present disclosure, the distance between the touch electrode line and the sub-pixel 200 along the row direction of the array refers to the shortest distance between the orthographic projection of the first touch electrode line 31 onto the substrate 1 and the orthographic projection of the sub-pixel 200 onto the substrate 1 along the row direction of the array. The distance between the touch electrode line and the sub-pixel 200 along the column direction of the array refers to the distance between the orthographic projection of the first touch electrode line 31 onto the substrate 1 and the orthographic projection of the sub-pixel 200 onto the substrate 1 along the column direction of the array. The line width of the grid line 30 between the adjacent sub-pixels 200 refers to the line width of the first touch electrode line 31 between the adjacent sub-pixels 200. It is to be noted that only one pixel arrangement mode is illustrated as an example in FIG. 8 and is not intended to limit the present disclosure.

For example, referring to FIG. 8, in the touch electrode line extending along the column direction of the array, the length of the second touch electrode line 32 closest to and surrounding the first sub-pixel 21 is L1+L2, and the length of the second touch electrode 32 line closest to and surrounding the second sub-pixel 22 is L2+L3, where L1<L2<L3 and (L2+L3)>(L1+L2). In general, at the same oblique viewing angle, the blocking degree of the grid line 30 for the first sub-pixel 21 is greater than the blocking degree of the grid line 30 for the second sub-pixel 22.

For example, referring to FIG. 8, each pixel 20 further includes the third sub-pixel 23 emitting the third color, and the luminous intensity of the second sub-pixel 22 is greater than the luminous intensity of the third sub-pixel 23 at the same driving current. In the touch electrode line extending along the column direction of the array, the length of the second touch electrode line 32 closest to and surrounding the second sub-pixel 22 is less than the length of the second touch electrode line 32 closest to and surrounding the third sub-pixel 23; and/or in the touch electrode line extending along the row direction of the array, the length of the second touch electrode line 32 closest to and surrounding the second sub-pixel 22 is less than the length of the second touch electrode line 32 closest to and surrounding the third sub-pixel 23.

Figure 9:
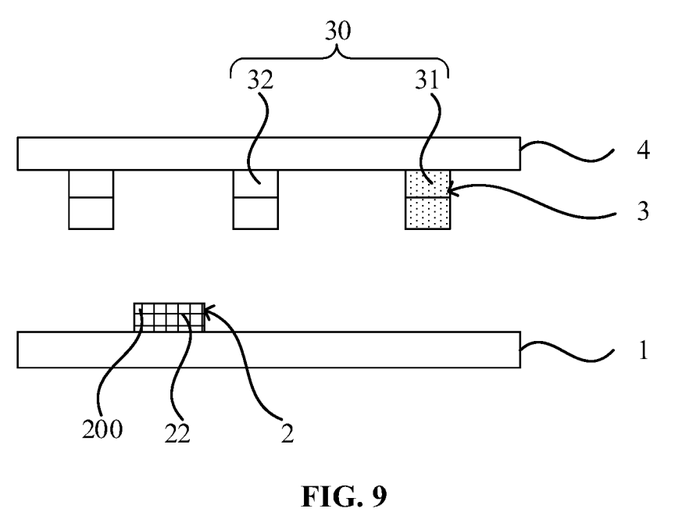
FIG. 9 is a structural diagram along section BB' of FIG. 8.

FIG. 9 is a structural diagram along section BB' of FIG. 8. Referring to FIGS. 8 and 9, the light blocking structure 3 includes at least two staked layers of touch electrodes. Exemplarily, the light blocking structure 3 includes two stacked layers of touch electrodes along the direction vertical to the substrate 1. Two layers of first touch electrode lines 31 are stacked along the direction vertical to the substrate 1, and two layers of second touch electrode lines 32 are stacked along the direction vertical to the substrate 1. Since the second touch electrode line 32 made of the transparent conductive material has a greater resistance compared with the metal, at least two staked layers of touch electrodes are disposed in this embodiment of the present disclosure so that the resistance of the second touch electrode line 32 is reduced, and meanwhile, the resistance of the first touch electrode line 31 is reduced, so that the touch sensitivity of the touch electrode is improved.

Figure 10:
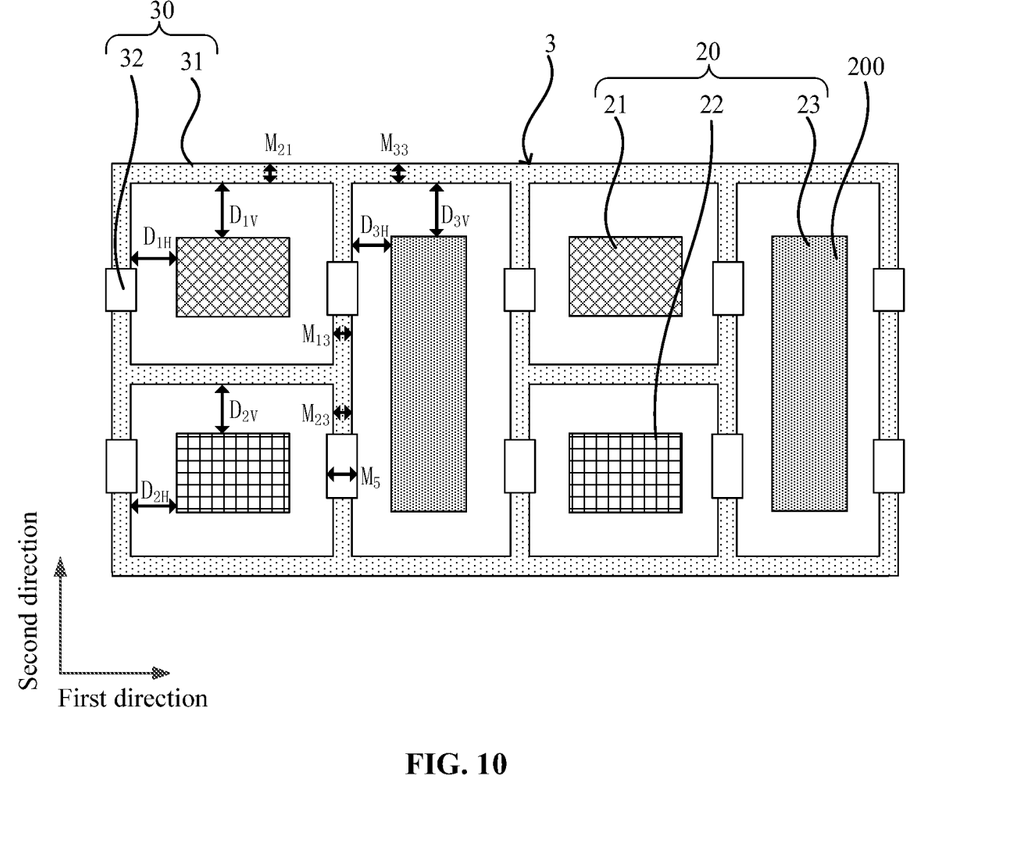
FIG. 10 is a top view of another display panel according to an embodiment of the present disclosure.

FIG. 10 is a top view of another display panel according to an embodiment of the present disclosure. Referring to FIG. 10, the touch electrode line includes the first touch electrode line 31 made of the metal material and the second touch electrode line 32 made of the transparent conducting material. At least part of the first touch electrode lines 31 is positioned at the corner of the grid. The line width of the second touch electrode line 32 is greater than the line width of the first touch electrode line 31. Exemplarily, the second touch electrode line 32 extends along the column direction of the array, and the line width of the second touch electrode line 32 is $M_5$, where $M_5 > M_{13}$ and $M_5 > M_{23}$. Since the second touch electrode line 32 made of the transparent conductive material has a greater resistance compared with the metal, the line width of the second touch electrode line 32 is set to be greater than the line width of the first touch electrode line 31 in this embodiment of the present disclosure so that the resistance of the second touch electrode line 32 is reduced and the touch sensitivity of the touch electrode is improved.

Figure 11:
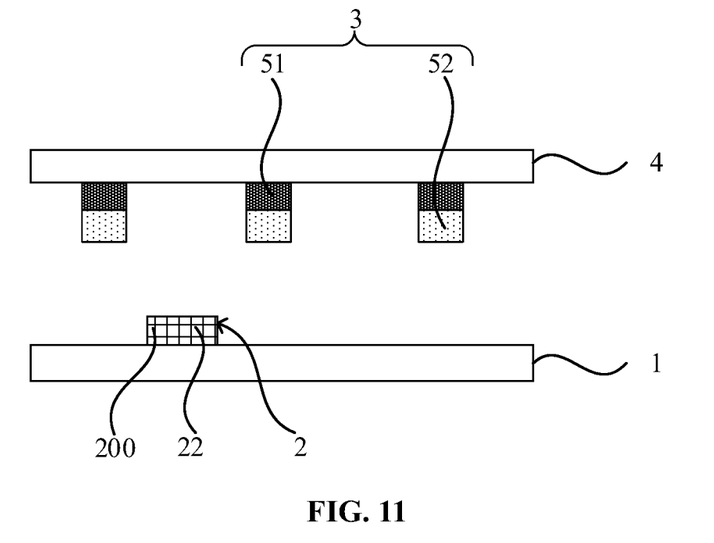
FIG. 11 is a sectional view of another display panel according to an embodiment of the present disclosure.

FIG. 11 is a sectional view of another display panel according to an embodiment of the present disclosure. Referring to FIG. 11, the light blocking structure 3 includes a grid-shaped black matrix 51.

Exemplarily, referring to FIG. 11, the light blocking structure 3 may include the black matrix 51 and a touch electrode 52. The black matrix 51 is positioned between the touch electrode 52 and the cover plate 4, and the orthographic projection of the touch electrode 52 onto the cover plate 4 is positioned within the orthographic projection of the black matrix 51 onto the cover plate 4. The black matrix 51 can prevent the touch electrode 52 from reflecting external ambient light, that is, prevent the outline of the touch electrode 52 from being visible, thereby improving the display effect. In other embodiments, the light blocking structure 3 may include only the black matrix 51 without the touch electrode 53, which is not limited in the present disclosure.

Optionally, referring to FIGS. 1 to 11, the first sub-pixel 21 is a green sub-pixel, the second sub-pixel 22 is a red sub-pixel, and the third sub-pixel 23 is a blue sub-pixel. The green sub-pixel emits green light, the red sub-pixel emits red light, and the blue sub-pixel emits blue light. In this embodiment of the present disclosure, due to materials or processes adopted in the manufacturing process, the luminous intensity of the green sub-pixel is greater than the luminous intensity of the red sub-pixel and the luminous intensity of the red sub-pixel is greater than the luminous intensity of the blue sub-pixel at the same driving current. In this case, the color cast problem of the display panel at a large viewing angle can be relieved or even eliminated by using the improved design of the original light blocking structure 3 in the display panel according to any one of the above embodiments.

Optionally, referring to FIGS. 1 to 11, the first sub-pixel 21 is a red sub-pixel, the second sub-pixel 22 is a green sub-pixel, and the third sub-pixel 33 is a blue sub-pixel. In this embodiment of the present disclosure, due to the materials or the processes adopted in the manufacturing process, the luminous intensity of the red sub-pixel is greater than the luminous intensity of the green sub-pixel and the luminous intensity of the green sub-pixel is greater than the luminous intensity of the blue sub-pixel at the same driving current. In this case, the color cast problem of the display panel at a large viewing angle can be relieved or even eliminated by using the improved design of the original light blocking structure 3 in the display panel according to any one of the above embodiments.

Optionally, referring to FIGS. 1 to 11, the first sub-pixel 21 is a blue sub-pixel, the second sub-pixel 22 is a green sub-pixel, and the third sub-pixel 33 is a red sub-pixel. In this embodiment of the present disclosure, due to the materials or the processes adopted in the manufacturing process, the luminous intensity of the blue sub-pixel is greater than the luminous intensity of the green sub-pixel and the luminous intensity of the green sub-pixel is greater than the luminous intensity of the red sub-pixel at the same driving current. In this case, the color cast problem of the display panel at a large viewing angle can be relieved or even eliminated by using the improved design of the original light blocking structure 3 in the display panel according to any one of the above embodiments.

Figure 12:
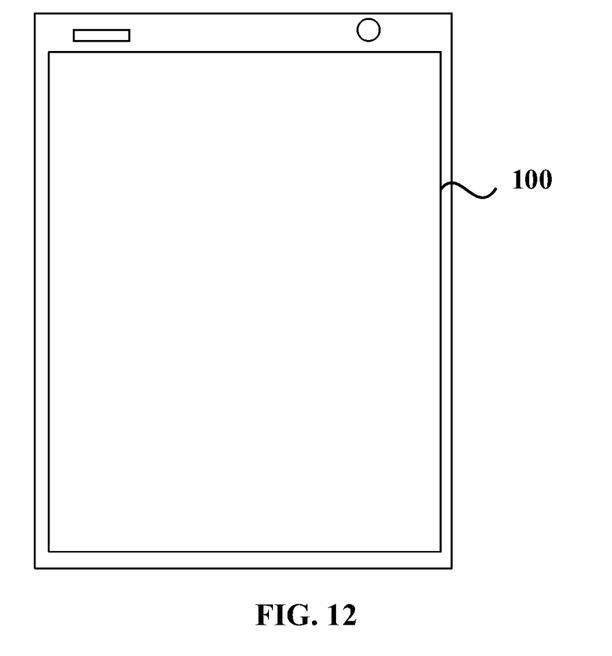
FIG. 12 is a structural diagram of a display device according to an embodiment of the present disclosure.

An embodiment of the present disclosure further provides a display device. FIG. 12 is a schematic structural diagram of the display device according to this embodiment of the present disclosure. Referring to FIG. 12, the display device includes any display panel 100 provided by the embodiments of the present disclosure. The display device may be a mobile phone, a tablet PC, an intelligent wearable device and so on.

It is to be noted that the above are merely preferred embodiments of the present disclosure and the technical principles used therein. It can be understood by those skilled in the art that the present disclosure is not limited to the specific embodiments described herein. Those skilled in the art can make various apparent modifications, adaptations, combinations and substitutions without departing from the scope of the present disclosure. Therefore, while the present disclosure has been described in detail through the above embodiments, the present disclosure is not limited to the above embodiments and may include more other equivalent embodiments without departing from the inventive concept of the present disclosure. The scope of the present disclosure is determined by the scope of the appended claims.

What is claimed is:

1. A display panel, comprising:
   a display region;
   a substrate;
   a display function layer, wherein the display function layer is positioned in the display region on a first side of the substrate, wherein the display function layer comprises a plurality of pixels arranged in an array along a first direction and a second direction, each of the plurality of pixels comprises a plurality of sub-pixels, the plurality of sub-pixels comprise at least a first sub-pixel emitting a first color and a second sub-pixel emitting a second color, and a first luminous intensity of the first sub-pixel is greater than a second luminous intensity of the second sub-pixel at a same driving current; and
   a light blocking structure, wherein the light blocking structure is positioned on a first side, facing away from the substrate, of the display function layer and comprises a grid-shaped grid line, wherein along a direction vertical to the substrate, each of the plurality of sub-pixels is positioned in a grid surrounded by the grid line, and at least part of the grid line blocks light;
   wherein a first shortest distance between a first orthographic projection of the first sub-pixel onto the substrate and a third orthographic projection of the grid line onto the substrate is $D_{1H}$ along a row direction of the array, and a second shortest distance between a second orthographic projection of the second sub-pixel onto the substrate and the third orthographic projection of the grid line onto the substrate is $D_{2H}$ along the row direction of the array; and
   wherein a third shortest distance between the first orthographic projection of the first sub-pixel onto the substrate and the third orthographic projection of the grid line onto the substrate is $D_{1V}$ along a column direction of the array, and a fourth shortest distance between the second orthographic projection of the second sub-pixel onto the substrate and the third orthographic projection of the grid line onto the substrate is $D_{2V}$ along the column direction of the array, wherein one or more of $D_{1H}<D_{2H}$ or $D_{1V}<D_{2V}$.

2. The display panel of claim 1, wherein the plurality of sub-pixels further comprise a third sub-pixel emitting a third color, and the second luminous intensity of the second sub-pixel is greater than a third luminous intensity of the third sub-pixel at the same driving current;
   wherein a fifth shortest distance between a fourth orthographic projection of the third sub-pixel onto the substrate and the third orthographic projection of the grid line onto the substrate is $D_{3H}$ along the row direction of the array; and
   wherein a sixth shortest distance between the fourth orthographic projection of the third sub-pixel onto the substrate and the third orthographic projection of the grid line onto the substrate is $D_{3V}$ along the column direction of the array, wherein one or more of $D_{2H}<D_{3H}$ or $D_{2V}<D_{3V}$.

3. The display panel of claim 1, wherein the plurality of sub-pixels further comprise a third sub-pixel emitting a third color, and the second luminous intensity of the second sub-pixel is greater than a third luminous intensity of the third sub-pixel at the same driving current;
  wherein, in the each of the plurality of pixels,
    the first sub-pixel, the second sub-pixel and the third sub-pixel are arranged in a delta shape,
    the first sub-pixel is arranged in a same column as the second sub-pixel along the column direction of the array, and
    the third sub-pixel is positioned in a different column than the first sub-pixel; and
  the plurality of pixels are arranged cyclically along the row direction of the array and the column direction of the array;
  wherein a first line width of the grid line between the second sub-pixel and the first sub-pixel adjacent to each other is $M_{21}$;
  wherein a second line width of the grid line between the first sub-pixel and the third sub-pixel adjacent to each other is $M_{13}$;
  wherein a third line width of the grid line between the second sub-pixel and the third sub-pixel adjacent to each other is $M_{23}$;
  wherein a fourth line width of the grid line between two adjacent third sub-pixels is $M_{33}$; and
  wherein $M_{21} > M_{13} > M_{23} > M_{33}$.

4. The display panel of claim 1, wherein the plurality of sub-pixels further comprise a third sub-pixel emitting a third color, and the second luminous intensity of the second sub-pixel is greater than a third luminous intensity of the third sub-pixel at the same driving current;
  wherein, in the each of the plurality of pixels,
    the first sub-pixel, the second sub-pixel and the third sub-pixel are arranged in a delta shape,
    the first sub-pixel is arranged in a same column as the second sub-pixel along the column direction of the array, and
    the third sub-pixel is positioned in a different column than the first sub-pixel; and
  the plurality of pixels are arranged cyclically along the row direction of the array, and two adjacent rows of the plurality of pixels are misaligned by a width of one of the plurality of sub-pixels;
  wherein a first line width of the grid line between the second sub-pixel and the first sub-pixel adjacent to each other is $M_{21}$;
  wherein a second line width of the grid line between the first sub-pixel and the third sub-pixel adjacent to each other is $M_{13}$;
  wherein a third line width of the grid line between the second sub-pixel and the third sub-pixel adjacent to each other is $M_{23}$; and
  wherein $M_{21} > M_{13} > M_{23}$.

5. The display panel of claim 1, wherein the plurality of sub-pixels further comprises a third sub-pixel emitting a third color, and the second luminous intensity of the second sub-pixel is greater than a third luminous intensity of the third sub-pixel at the same driving current;
  wherein, in the each of the plurality of pixels, the first sub-pixel, the second sub-pixel and the third sub-pixel are arranged in sequence along the row direction of the array; and
  the plurality of pixels are arranged cyclically along the row direction of the array and the column direction of the array;
  wherein a first line width of the grid line between the second sub-pixel and the first sub-pixel adjacent to each other is $M_{21}$;
  wherein a second line width of the grid line between the first sub-pixel and the third sub-pixel adjacent to each other is $M_{13}$;
  wherein a third line width of the grid line between the second sub-pixel and the third sub-pixel adjacent to each other is $M_{23}$;
  wherein a fourth line width of the grid line between two adjacent first sub-pixels is $M_{11}$;
  wherein a fifth line width of the grid line between two adjacent second sub-pixels is $M_{22}$;
  wherein a sixth line width of the grid line between two adjacent third sub-pixels is $M_{33}$; and
  wherein $M_{21} > M_{13} > M_{23} > M_{33}$ and $M_{11} > M_{22} > M_{33}$.

6. The display panel of claim 1, wherein the light blocking structure comprises a touch electrode, which comprises a grid-shaped touch electrode line, and the grid-shaped touch electrode line comprises a metal material.

7. The display panel of claim 6, wherein the touch electrode line comprises a first touch electrode line made of the metal material and a second touch electrode line made of the metal material; and
  wherein the first touch electrode line is positioned at a corner of the grid, and a first touch electrode line width of the first touch electrode line is greater than a second touch electrode line width of the second touch electrode line.

8. The display panel of claim 6, wherein the touch electrode line comprises a first touch electrode line made of the metal material and a second touch electrode line made of a transparent conductive material, wherein
  in the touch electrode line extending along the column direction of the array, a first length of the second touch electrode line closest to and surrounding the first sub-pixel is less than a second length of the second touch electrode line closest to and surrounding the second sub-pixel; and/or
  in the touch electrode line extending along the row direction of the array, a third length of the second touch electrode line closest to and surrounding the first sub-pixel is less than a fourth length of the second touch electrode line closest to and surrounding the second sub-pixel.

9. The display panel of claim 8, wherein at least part of the first touch electrode line is positioned at a corner of the grid, and a second touch electrode line width of the second touch electrode line is greater than a first touch electrode line width of the first touch electrode line.

10. The display panel of any one of claim 2, wherein the first sub-pixel is a green sub-pixel, the second sub-pixel is a red sub-pixel, and the third sub-pixel is a blue sub-pixel.

11. The display panel of any one of claim 3, wherein the first sub-pixel is a green sub-pixel, the second sub-pixel is a red sub-pixel, and the third sub-pixel is a blue sub-pixel.

12. The display panel of any one of claim 4, wherein the first sub-pixel is a green sub-pixel, the second sub-pixel is a red sub-pixel, and the third sub-pixel is a blue sub-pixel.

13. The display panel of any one of claim 5, wherein the first sub-pixel is a green sub-pixel, the second sub-pixel is a red sub-pixel, and the third sub-pixel is a blue sub-pixel.

14. The display panel of any one of claim 2, wherein the second sub-pixel is a green sub-pixel, the first sub-pixel is one of a red sub-pixel and a blue sub-pixel, and the third sub-pixel is another one of the red sub-pixel and the blue sub-pixel.

15. The display panel of any one of claim 3, wherein the second sub-pixel is a green sub-pixel, the first sub-pixel is one of a red sub-pixel and a blue sub-pixel, and the third sub-pixel is another one of the red sub-pixel and the blue sub-pixel.

16. The display panel of any one of claim 4, wherein the second sub-pixel is a green sub-pixel, the first sub-pixel is one of a red sub-pixel and a blue sub-pixel, and the third sub-pixel is another one of the red sub-pixel and the blue sub-pixel.

17. The display panel of any one of claim 5, wherein the second sub-pixel is a green sub-pixel, the first sub-pixel is one of a red sub-pixel and a blue sub-pixel, and the third sub-pixel is another one of the red sub-pixel and the blue sub-pixel.

18. The display panel of claim 1, wherein the each of the plurality of sub-pixels comprises a first edge and a second edge, and a first edge length of the first edge is greater than a second edge length of the second edge;

wherein a first edge shortest distance between a first edge orthographic projection of the first edge onto the substrate and a grid line orthographic projection of the grid line closest to the first edge onto the substrate is $D_{11}$, and a second edge shortest distance between a second edge orthographic projection of the second edge onto the substrate and the grid line orthographic projection of the grid line closest to the second edge onto the substrate is $D_{21}$; and wherein $D_{11} > D_{21}$.

19. The display panel of claim 1, wherein the light blocking structure comprises a grid-shaped black matrix.

20. A display device, comprising a display panel, wherein the display panel comprises:
 a display region;
 a substrate;
 a display function layer, wherein the display function layer is positioned in the display region on a first side of the substrate, wherein the display function layer comprises a plurality of pixels arranged in an array along a first direction and a second direction, each of the plurality of pixels comprises a plurality of sub-pixels, the plurality of sub-pixels comprise at least a first sub-pixel emitting a first color and a second sub-pixel emitting a second color, and a luminous intensity of the first sub-pixel is greater than a luminous intensity of the second sub-pixel at a same driving current; and
 a light blocking structure, wherein the light blocking structure is positioned on a first side, facing away from the substrate, of the display function layer and comprises a grid-shaped grid line, wherein along a direction vertical to the substrate, each of the plurality of sub-pixels is positioned in a grid surrounded by the grid line, and at least part of the grid line blocks light,
wherein a first shortest distance between a first orthographic projection of the first sub-pixel onto the substrate and a third orthographic projection of the grid line onto the substrate is $D_{1H}$ along a row direction of the array, and a second shortest distance between a second orthographic projection of the second sub-pixel onto the substrate and the third orthographic projection of the grid line onto the substrate is $D_{2H}$ along the row direction of the array; and
wherein a third shortest distance between the first orthographic projection of the first sub-pixel onto the substrate and the third orthographic projection of the grid line onto the substrate is $D_{1V}$ along a column direction of the array, and a fourth shortest distance between the second orthographic projection of the second sub-pixel onto the substrate and the third orthographic projection of the grid line onto the substrate is $D_{2V}$ along the column direction of the array, wherein one or more of $D_{1H} < D_{2H}$ or $D_{1V} < D_{2V}$.

* * * * *